United States Patent Office 2,779,743
Patented Jan. 29, 1957

2,779,743

PLASTICIZING VINYL RESINS

Edmund H. Schwencke, New York, N. Y., assignor to Elastomer Chemical Corporation, Newark, N. J., a corporation of New Jersey No Drawing. Application December 4, 1951, Serial No. 259,890

3 Claims. (Cl. 260—23)

This invention relates to the plasticizing of certain vinyl ester resins, namely, vinyl chloride and copolymers of vinyl chloride and vinyl acetate.

In the early history of vinyl ester resins a series of plasticizers were discovered which are known and generally referred to in the art as "ester type" plasticizers. They include, for example, phosphates, phthalates, sebacates, glycollates, etc., some of which are derived from organic and some are derived from inorganic acids.

One of the disadvantages of ester type plasticizers has been the limited proportion of plasticizer which could be successfully incorporated in the resin. One part plasticizer to one part resin has been generally regarded as the maximum permissible, but for most purposes the proportion must be considerably less if sweating out is to be avoided.

Another disadvantage of ester type plasticizers has been the relatively high temperature required to cure the plasticized resin to produce a cured final product. Temperatures ranging from 325° to 375° F. have been required, and such temperatures restrict the useful applications of the resin. When used in connection with textile fabrics or textile fibers, for example, such temperatures are difficult to apply and in connection with synthetic fibers and fabrics such as rayon, nylon and Vinyon which have low melting points, the application of such temperatures cannot be permitted because of possible damage to the fibers.

In U. S. Patent No. 2,515,382, I have described a plasticizer consisting of an aromatic hydrocarbon oil which I have been able to incorporate in vinyl ester resins in varying proportions even as high as two parts plasticizer to one part resin. The resulting product may be cured at relatively low temperatures and has found many useful applications. While this plasticizer has been extremely satisfactory for many purposes, it has not been satisfactory where it is required that the final product be light in color. The hydrocarbon oil has a brown color which appears in the final product, and while it is possible to add pigments which conceal the brown, the cured products are all quite dark in tone. Such colors are not satisfactory for uses such as prosthetics, for example. Moreover, these colors are not stable, for they exhibit marked tendency to become darker when exposed to light, particularly ultra-violet light.

Another weakness of such aromatic hydrocarbons as plasticizers is that the cured products exhibit poor low temperature flexibility. At 32° F. and below they tend to become brittle and can sometimes be shattered by a sharp blow.

It is an object of the present invention to provide a novel method of plasticizing certain vinyl ester resins, namely, polyvinyl chloride and copolymers of vinyl chloride and vinyl acetate, with ester type plasticizers, to produce a plasticized resin which may be cured at relatively low temperatures of 200° to 250° F. The resulting product is light in color and has good low temperature flexibility. While I have found it possible to use as much as one and three-quarter parts of plasticizer to one part resin, I prefer to use approximately one and one-half parts of plasticizer to one part resin to provide a creamy, free flowing product which is readily pourable. By the addition of suitable pigments, fillers and stabilizers, a series of light colored tints may be obtained as is frequently desirable.

According to the present invention I incorporate in the plasticizer a small proportion of aluminum stearate, but it is important to note that the aluminum stearate is melted into the plasticizer and not merely dispersed therein. As the first step in the process, the aluminum stearate is melted into an ester plasticizer derived from an organic acid and selected from the group consisting of phthalates, adipates, sebacates and azaleates, using 5 to 10 parts plasticizer to one part fatty acid salt. In melting, the mixture of plasticizer and aluminum stearate is heated slowly to approximately 230° F. while stirring constantly, and is held at that temperature until the aluminum stearate is completely melted, as indicated by the mixture becoming clear and transparent. The mixture is then allowed to cool to room temperature, when it will be found to be in the form of a rather heavy gel. This gel may then be mixed with sufficient additional ester plasticizer derived from an inorganic acid to bring the plasticizer and aluminum stearate into the desired proportions of one part aluminum stearate to from seventy-five to one hundred and twenty-five parts plasticizer (total organic and inorganic). The preferable proportion is one part aluminum stearate to approximately one hundred parts plasticizer.[1]

Two considerations necessitate the foregoing procedure, (1) the aluminum stearate cannot be successfully melted into an ester plasticizer derived from an inorganic acid, and (2) the desired low temperature curing properties cannot be obtained if ester plasticizers derived from organic acids are used entirely. Success depends, therefore, on melting the aluminum stearate into a small quantity of an ester plasticizer derived from an organic acid and then adding additional ester plasticizer derived from an inorganic acid.

Thereafter, the plasticizer with the incorporated aluminum stearate may be mixed with the resin in proportions varying from one part plasticizer to one part resin to one and three-quarter parts plasticizer to one part resin.

*Example*

|  | Parts |
|---|---|
| Aluminum stearate (free fatty acid content 7.5 to 10%) | 1.5 |
| Dioctyl phthalate | 12 |
| Tri-cresyl phosphate | 138 |
| Resin (85% vinyl chloride and 15% vinylacetate) | 100 |

The aluminum stearate is first dispersed in the dioctyl phthlate and the mixture is then heated slowly to a temperature of approximately 230° while stirring constantly. At this temperature the stearate melts and blends thoroughly with the plasticizer and if the mixture is held at this temperature for a period of ten to fifteen minutes, thorough blending is assured. The mixture is then allowed to cool to room temperature. While cooling a gel structure develops in the mixture and at room temperature the mixture takes the form of a heavy gel. This gel is then mixed with the tri-cresyl phosphate and ---
[1] In the case of aluminum stearate in which several grades are commercially available, these proportions may have to be varied slightly depending on the fatty acid content of the stearate. The proportions given are satisfactory when using aluminum stearate having a free fatty acid content of from 7.5% to 10%. If the free fatty acid content is above 10% a higher proportion of stearate should be used; if lower than 7.5% a lower proportion may be used.

the resulting mixture is then combined with the resin. Any suitable type of mixing or milling equipment may be used for these mixing operations. The resulting product will be in the form of a creamy, free-flowing liquid which is readily pourable. In this form it may be poured into molds or may be spread onto surfaces such as textile fabrics, or it may be foamed. Thereafter it may be cured at temperatures between 200° and 250° F. without appreciable shrinkage.

It will be understood that the invention may be variously modified and embodied within the scope of the subjoined claims.

I claim as my invention:

1. The methd of plasticizing vinyl ester resins selected from the group consisting of polyvinyl chloride and a copolymer of vinyl chloride and vinyl acetate which comprises melting aluminum stearate into dioctyl phthalate in proportions of one part aluminum stearate to between five and ten parts plasticizer, adding tricresyl phosphate to bring the mixture to the proportions of one part aluminum stearate to between seventy-five and one hundred and twenty-five parts total plasticizer, and mixing said mixture with resin in proportions of one part resin to between one and one and three-quarter parts plasticizer.

2. A plasticizer for vinyl ester resins selected from the group consisting of polyvinyl chloride and a copolymer of vinyl chloride and vinyl acetate which comprises five to ten parts of dioctyl phthalate into which has been melted one part of aluminum stearate and seventy to one hundred and twenty parts of tricresyl phosphte.

3. A vinyl ester resin selected from the group consisting of polyvinyl chloride and a copolymer of vinyl chloride and vinyl acetate plasticized by a mixture of tricresyl phosphate and dioctyl phthalate in proportions of one part resin to between one and one and one-half parts plasticizer, in which said plasticizer contains melted aluminum stearate in the proportions of one part aluminum stearate to between seventy-five and one hundred and twenty-five parts plasticizer.

References Cited in the file of this patent

UNITED STATES PATENTS

| | | |
|---|---|---|
| 2,376,312 | Morgan | May 15, 1945 |
| 2,528,507 | Foye | Nov. 7, 1950 |
| 2,575,553 | Kolwoort | Nov. 20, 1951 |

OTHER REFERENCES

Dutch Boy, DS 207, National Lead Co. publication (received in Patent Office March 13, 1952) (3 pages).